Oct. 6, 1953 L. O. SCHEVENELL 2,654,284
SCREW WITH SELF-DRILLING END
Filed May 23, 1951
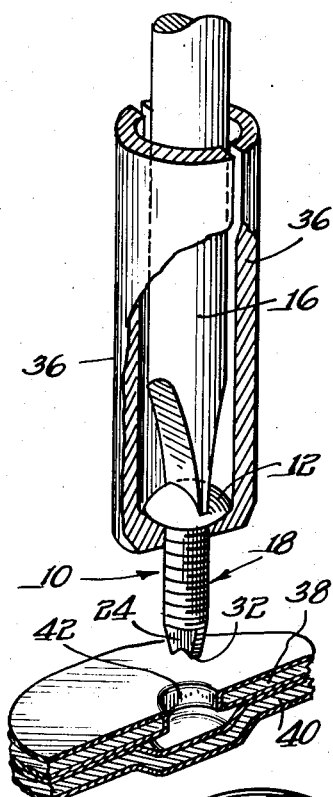
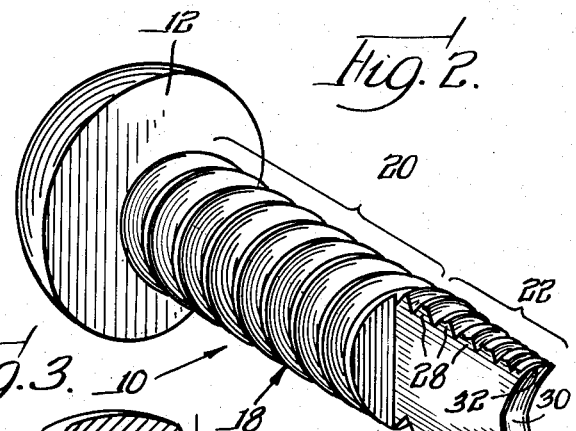
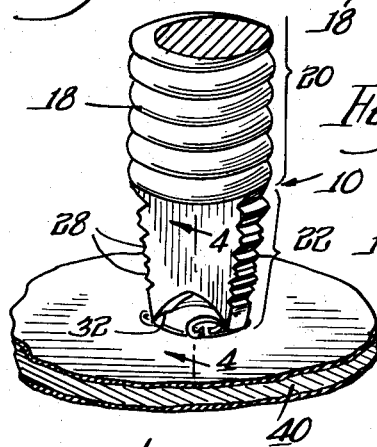
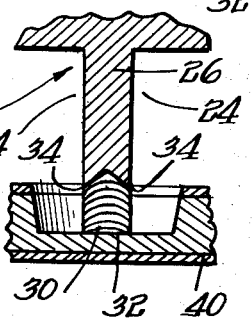
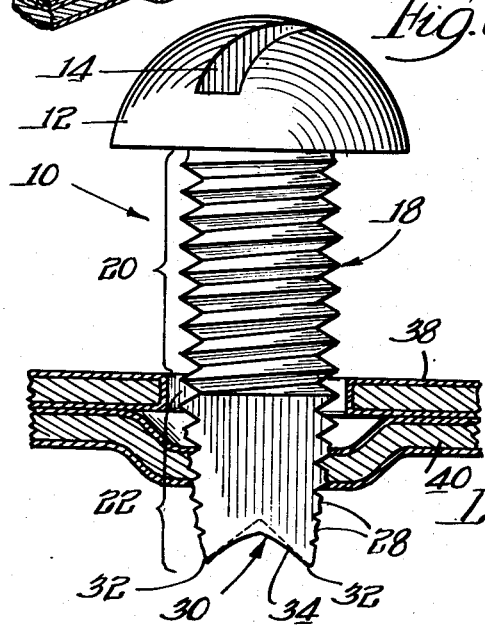
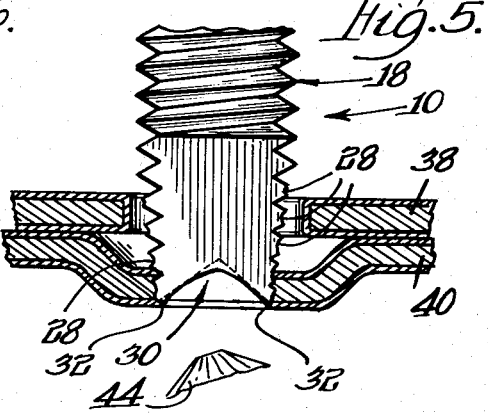
INVENTOR.
Leonard O. Schevenell
BY
Moore, Olson & Trexler
Attys Patented Oct. 6, 1953

2,654,284

UNITED STATES PATENT OFFICE 2,654,284

SCREW WITH SELF-DRILLING END

Leonard O. Schevenell, Chicago, Ill., assignor to Illinois Tool Works, Chicago, Ill., a corporation of Illinois Application May 23, 1951, Serial No. 227,770

2 Claims. (Cl. 85—47)

This invention relates generally to screw fasteners adapted to form an aperture in a work piece and subsequently form thread convolutions within the work surface defining said aperture, and more particularly to a combined aperture and thread forming screw fastener wherein the entering end of the fastener is provided with a novel arrangement of work penetrating edges or teeth.

It is an important object of the present invention to provide a combined aperture and thread forming screw fastener of the type referred to above, wherein the entering slabbed extremity of the fastener is not only provided with a gradual taper to facilitate entrance into a work aperture, but is also provided with an arrangement of teeth at the entering end particularly adapted for penetrating sheet metal.

It is a further object of the present invention to provide a fastener of the type referred to above which may be used to penetrate a work surface which has been coated with easily fracturable material, such as porcelain or the like. Porcelain and similar coatings, when struck or engaged by a relatively hard member such as the entering extremity of a screw, have a normal tendency to develop fractures or cracks which are not only unsightly but also impair the work surface. To reduce chipping or cracking to a minimum, the present invention contemplates a combined aperture and thread forming fastener which at its entering extremity is provided with teeth adapted to spin their way through the work surface by a scoring action, as distinguished from the conventional drilling action.

More specifically the present invention contemplates a combined aperture and thread forming screw fastener in which the entering end of the fastener is provided with scoring teeth diametrically separated by a centrally disposed recess in such a manner as to assure the presence of relatively sharp arcuate edges which, when turned against a work surface, will initially score the surface and finally penetrate the work piece.

The foregoing and other objects and advantages will be more apparent from the following detailed description when considered in connection with the accompanying drawing, wherein—

Fig. 1 discloses a combined aperture and thread forming screw fastener of the present invention held within a screw driver in readiness to be applied to a work piece;

Fig. 2 is a perspective view of the screw fastener showing the novel entering extremity thereof;

Fig. 3 is a perspective view of the aperture and thread forming portion of the fastener of Fig. 1 as it is initially applied to the coated surface of a work piece;

Fig. 4 is an enlarged fragmentary vertical sectional view taken substantially along the line 4—4 of Fig. 3;

Fig. 5 discloses the fastener just finishing complete penetration of the work piece, the slug removed from the work piece shown immediately beneath the work aperture; and Fig. 6 is a view similar to Fig. 5 showing the complete fastener after the entering end has completely pierced the work piece.

Referring now to the drawing more in detail, wherein like numerals have been employed to designate similar parts throughout the various figures, it will be seen that one embodiment of the invention consists of a fastener designated generally by the numeral 10. The fastener 10 includes a conventional head 12 provided with means in the form of a cross slot 14 designed to accommodate a complementary blade of a screw driver 16. A threaded shank 18 consists of a threaded holding portion 20 of substantially uniform diameter and a tapered entering portion 22.

In the disclosed embodiment the portion 20 of the fastener shank 18 is provided with a conventional thread of uniform height and diameter. The tapered entering portion 22 of the shank is slabbed by removing opposed chordal segments so as to present recesses 24 between which is positioned a central shank section 26. This shank section 26 is substantially rectangular in transverse cross-section. By slabbing the entering extremity of the fastener, the thread convolutions of diminishing height are intersected so as to present a plurality of cutting teeth 28 which diminish in height toward the entering end of the fastener. These cutting teeth 28 are in helical alignment with the thread on the holding portion of the shank.

Particular attention is directed to the entering end surface 30. This end surface 30 is preferably formed in the fastener before the slabbing operation and partakes of the shape of a cone. Thus, when the recesses 24 are formed, the remaining conical surface 30 intersects the peripheral portion of the shank and the side surfaces defining the recesses 24. This intersection of the conical surface 30 with the complementary peripheral surfaces of the entering end of the shank presents oppositely disposed relatively sharp arcuate edges 32 and oppositely disposed arcuate edges 34.

In Fig. 1 the fastener 10 is shown coupled with the screw driver shank 16 and held in operative association with the screw driver blade by a pair of fragmentarily disclosed jaws 36. Inasmuch as the screw driver per se does not form a part of the present invention, the jaws 36 are not disclosed in detail, but it will suffice to say that these jaws may be moved so as to be disengaged from the clamping side of the screw head 12 as the screw approaches its final tightened position against a work surface. The arrangement of the work pieces 38 and 40 illustrates one practical application of a combined aperture and thread forming screw, such as the screw 10. Both the work piece 38 and the work piece 40 have a fracturable coating such as porcelain, the work piece 38 having an aperture 42 preformed therein through which the shank of the screw 10 may be inserted. As the rotating arcuate edges 32 at the entering end of the screw are brought to bear against the upper coated surface of the work piece 40, these edges perform a scoring operation as distinguished from an actual cutting operation which would normally result from the use of a drill. This scoring of the fracturable coating on the work piece 40 causes the coating to be completely penetrated without developing unsightly and undesirable cracks. Once the coated surface has been pierced, the screw is now in position to continue its cutting operation into the main body of the work sheet. As the screw forces its way into the work, the oppositely disposed edges 32 cooperate with the oppositely disposed edges 34 in cutting away material of the work sheet, until eventually a slug 44 (Fig. 5) is ejected from the forward or entering extremity of the fastener. Once the aperture has been formed within the work piece 40, the teeth 28 which diminish in height toward the entering end of the screw fastener begin the formation of a complementary internal thread helix within the wall which defines the previously formed aperture. As previously pointed out, these teeth 28 form helical continuations of the thread convolutions on the holding portion 20. Thus after the work aperture has been formed by the cutting edges at the entering end of the screw, the teeth 28 which gradually increase in height from the entering end of the fastener toward the holding portion 20, function to cut or form an internal thread helix within the work until ultimately the holding portion of the fastener shank is brought into helical registration with the thread in the work piece.

From the foregoing it will be apparent that the present invention contemplates a screw fastener of improved practical design which is capable of first scoring the work surface, then cutting an aperture through the work piece, followed by the formation of a thread within said work piece. The above described fastener has been found very practical for use with sheet metal, and also for use with sheet metal which carries a fragile, hard coating, such as porcelain and the like. The spinning or scoring operation of the arcuate cutting edges finds very practical application when used with relatively thin stock and stock having a coated surface, as referred to above. By having the entering end surface of the screw shank provided with a central recess which will present the above described arcuate penetrating or scoring edges, a very practical and highly efficiently operable aperture forming fastener is produced. The presence of the above mentioned scoring edges eliminates the necessity of making a center punch indentation, as is so often required when a conventional drill is to be used. In other words, the scoring or penetrating accomplished by the peripheral edges at the entering end of the fastener is in effect a combined self-centering and penetrating operation. Obviously, it is preferred to form the conical recess in the entering end surface of the fastener before the slabbing operation takes place, because in so doing the slabbing or recessing may be accomplished without holding these recesses to close centering tolerances. Slight variations in the recesses on opposite sides of the fastener axis do not change the circular contour of the scoring edges. It might also be said that the entering end of the fastener performs both a scoring and then a reaming action due to the cutting edges formed by the intersection of the conical wall with the peripheral portions of the screw shank. It is also preferable to employ a conical recess in which the maximum depth thereof approximates the thickness of the work piece with which it is to be used. The recesses provided as a result of the slabbing operation serve as chip storage cavities or reservoirs during the scoring, reaming and thread-cutting operations.

The invention has many practical applications other than those specifically referred to herein and disclosed in the drawing, and said invention should be limited only by the scope of the appended claims.

The invention is hereby claimed as follows:

1. A combined aperture and thread-cutting screw fastener comprising a head having means for accommodating a screw driving member, a shank extending from the under side of said head and having a threaded holding portion and an entering end portion of reduced cross-section, the entering end portion having opposed chordal segments removed to provide a relatively narrow blade portion with major and minor transverse axes and recesses on opposite sides thereof, a plurality of cutting teeth spaced axially along the narrow edges of the blade portion and of diminishing height toward the entering end surface of the blade portion, said entering end surface of the blade portion being notched along the major axis of the blade portion between the narrow edges thereof and internally relieved between the longitudinal edges of the said notched portion to provide angularly disposed cutting surfaces along the edge of each wide face of the blade portion, and a pair of arcuate cutting edges across the narrow entering edges of the blade portion intersecting adjacent cutting surfaces along the notched portions and cooperating therewith in advance of the cutting teeth to form an aperture in a work piece with the cuttings gaining access through the notched portion to the recesses provided on opposite sides of the blade portion to prevent clogging.

2. A combined aperture and thread-cutting screw fastener as claimed in claim 1, wherein the notched and internally relieved end of the blade portion is constituted by a conical surface.

LEONARD O. SCHEVENELL.

References Cited in the file of this patent

UNITED STATES PATENTS

| Number | Name | Date |
| --- | --- | --- |
| 2,017,550 | Scherer | Oct. 15, 1935 |
| 2,263,424 | Langer | Nov. 18, 1941 |